Figure 1:
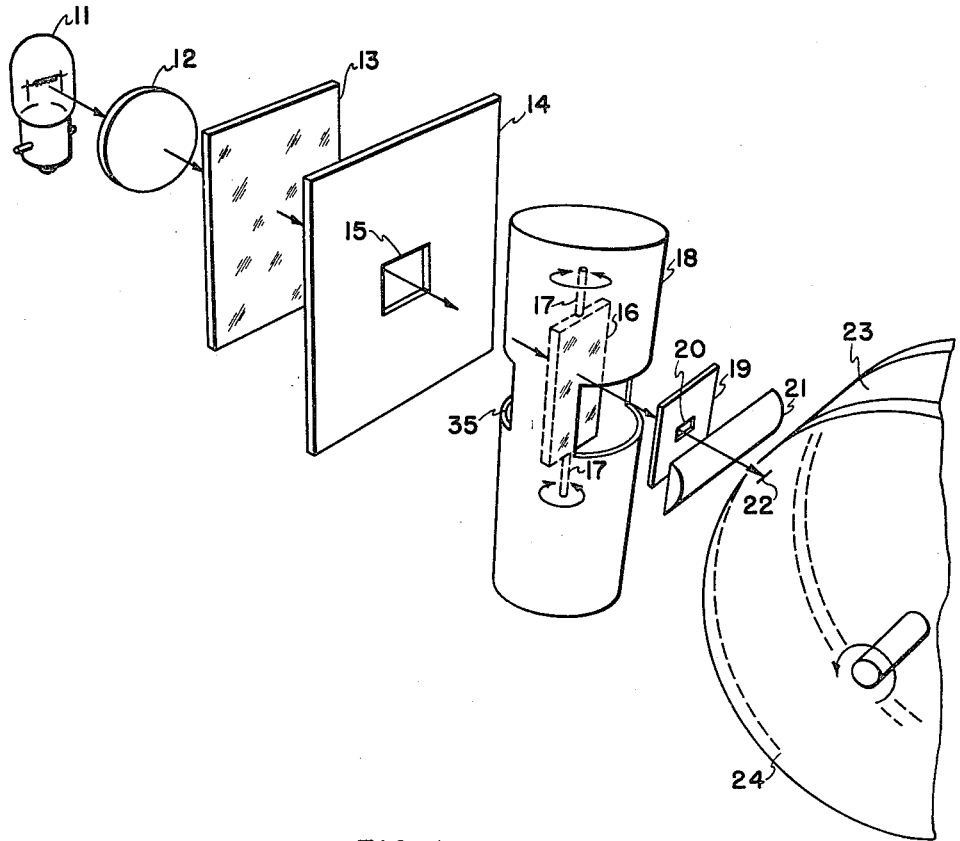

June 24, 1958   H. E. OWEN   2,840,441
RECORDING ELECTRICAL SIGNALS WITH POLARIZED LIGHT
Filed Nov. 10, 1954   2 Sheets-Sheet 1

Herbert E. Owen   Inventor
By W. N. Wright   Attorney

Herbert E. Owen  Inventor

United States Patent Office 2,840,441
Patented June 24, 1958

2,840,441

RECORDING ELECTRICAL SIGNALS WITH POLARIZED LIGHT

Herbert E. Owen, Tulsa, Okla., assignor to Esso Research and Engineering Company, a corporation of Delaware Application November 10, 1954, Serial No. 468,031

2 Claims. (Cl. 346—108)

This invention concerns the recording of an electrical signal in the form of what is known as a variable density photographic record wherein the photographic density is a function of the amplitude of the signal. A particular feature of the invention is the provision of novel means for making a variable density photographic record of the motion of a galvanometer to which the variable electrical signal is supplied. This invention is particularly useful for making seismic records in geophysical exploration.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors, known as geophones, which translate the detached motion into electrical impulses. The latter are suitably amplified and recorded on a seismograph. The conventional seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, amplified, and fed to the galvanometers. The strip of paper or film is moved longitudinally at a substantially constant speed and is provided by well known means with timing marks so that when the seismograph record or seismogram is later examined it is possible to determine the length of time required for the arrival of seismic waves at any particular point on the earth's surface, either directly from the source or by reflection from underlying strata. From other data obtained in the area being studied, such as seismic wave velocities in the various earth layers, it is then possible to estimate the depths of the various reflecting substrata.

Oscillograph records of detected seismic waves obtained as just described when made in favorable areas may often be examined visually to pick out prominent reflections which will show up as similar transients on the adjacent traces on the record. However, in many instances such reflections are difficult to distinguish because of the complexity of the wave forms. It has more recently been noted that if the detected impulses are recorded in the form of variable density photographic records many more reflections can often be noted. Suitable means for making such variable density records are described, for example, in U. S. Patent 2,051,153 of Frank Rieber.

When recording transients in the form of variable density photographic records, it is the usual practice to employ an incandescent lamp that varies in brightness in relation to the voltage fed to it. For best results the lamps must be carefully selected for their response characteristics. Furthermore, as disclosed in the aforementioned Rieber patent, the lamps must be small when they are used for seismic recording in view of the necessity for close spacing when recording a number of tracks or channels on a single film. There are a number of disadvantages associated with the use of such lamps. For example, since the lamps have a thermal lag the photographic record tends to be distorted somewhat and a complicated electric circuit is needed to overcome this, which not only requires extra equipment but also uses considerable power. Furthermore, when using the required electrical set-up to overcome lamp distortion a 100% modulation in the voltage fed to the equipment results in only 5% modulation in the light from the lamps. It is therefore necessary that the recording film have high contrast. This in turn leads to considerable distortion which is a disadvantage particularly if the variable density record is to be played back for reproduction in another form.

It is an object of the present invention to provide an apparatus for recording transient electrical signal directly as variable density traces on photographic media while detecting the transients with a galvanometer.

In accordance with the present invention a sheet of light polarizing material is supported by a galvanometer in such a manner as to intercept a beam of polarized light, the polarizing sheet being rotated by the galvanometer at right angles to the beam of light whereby light will be transmitted through the polarizing sheet in proportion to the angular rotation of the galvanometer. This transmitted light may be focused onto a moving photographic recording medium to furnish a record indicative of the galvanometer motion.

Figure 2:
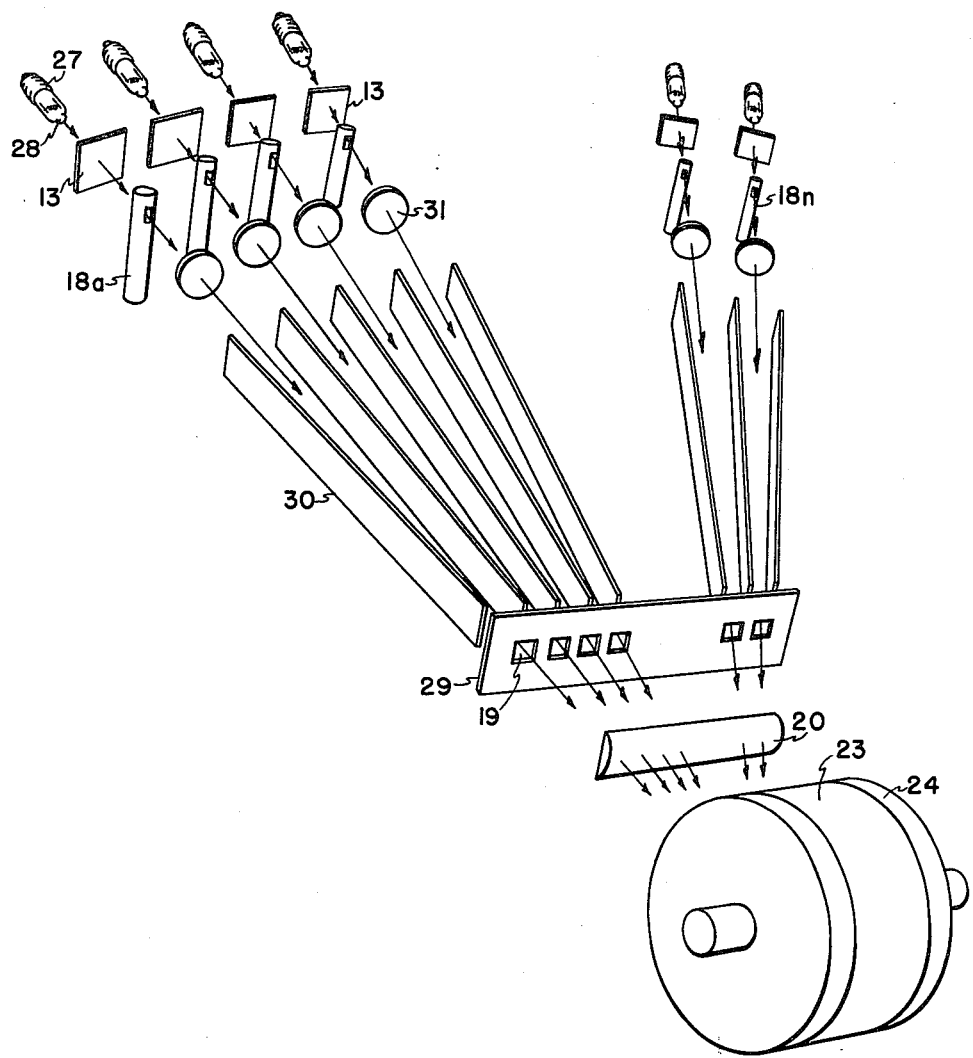

The nature and objects of the invention will be more fully appreciated when reference is made to the accompanying drawings in which:

Figure 1 is a schematic diagram of an apparatus suitable for practicing this invention; and Figure 2 is a diagram of an arrangement illustrating adaptation of the invention to multiple channel recording.

Referring now particularly to Figure 1 a light source 11 is provided adjacent which is positioned a condensing lens 12 to furnish a beam of essentially parallel light, which beam is directed through a polarizing film 13. This film may comprise a sheet polarizer such as the commercial material known as Polaroid. Briefly such sheet polarizers normally comprise a transparent plate or film supporting a plurality of dichroic crystals or equivalent material substantially all of which are oriented in one direction so that polarized light will pass through the film when it is oriented in one direction normal to the path of travel and will be substantially completely absorbed when the film is oriented in another direction normal to the path of travel of the light. The properties of such sheet polarizers are described by E. H. Land in Journal of the Optical Society of America, vol. 41, page 957 (December, 1951). The polarized light leaving the polarizing film impinges on a shield or light stop 14 provided with a central aperture 15 to limit the cross-sectional area of the polarized beam. The limited area beam is then directed through a second film of sheet polarizer 16 which is so constructed as to replace the conventional mirror of a moving coil recording galvanometer. The second film 16 is suspended by means of the conventional suspending wires 17 within a galvanometer housing 18. The beam transmitted by the second polarizing film passes through an aperture 20 in barrier 19 after which it is focused by a cylindrical lens 21 into a line image 22 on a photographic film or similar medium 23. Conveniently the latter is supported on a cylindrical drum 24 which moves the film past the image focus point at a fixed predetermined speed.

For proper operation of this invention the polarizing axis in each of the polarizing films 13 and 16 should be oriented at essentially 45° from the axis of rotation of the galvanometer. This orientation can be readily determined in the following manner. If the polarizing axis is vertical in one of the films or plates and horizontal in the other film or plate and the planes in which the two plates are positioned are parallel to each other there will be essentially complete extinction of light by the second plate. If plate 16 is then rotated on its vertical axis through 180° so that the planes are again parallel essentially complete extinction of light will again result.

If the polarizing axes in each of the plates are essentially 45° from the vertical there will be essentially complete extinction of light through the second plate when one side of plate 16 faces plate 13 and essentially full transmission of light when the plate 16 is rotated through 180° on its vertical axis so that its other side faces the plate 13. It is readily evident that this will be so since in one case the polarizing axes will be cross oriented and in the second case they will be parallel oriented.

The two films or plates 13 and 16 are properly placed with respect to each other if when the two plates are parallel the polarizing axis in one plate is 45° from the vertical in one direction and the polarizing axis in the other plate is 45° from the vertical in the opposite direction. As already noted, there will be essentially complete extinction of light through the second plate when the plates are in this position.

The zero setting of the galvanometer is so arranged that the polarizing film or plate 16 is set at an angle with respect to the fixed polarizing plate 13. Suitably at the zero setting, plate 16 will define an angle of approximately 30° with the fixed plate 13, plate 16 lying in a plane aligned with the axis of rotation of the galvanometer and plate 13 lying in a plane parallel to the axis of rotation of the galvanometer. Then as the galvanometer rotates in a counter clockwise position, looking from the top, less light will pass to the film than in the zero position. Conversely when the galvanometer rotates in the clockwise position more light will pass to the photographic film. Thus a record will be obtained in which the photographic density varies with the magnitude and polarity of the signal applied to the galvanometer. A galvanometer rotation of approximately 15 degrees in each direction from the zero setting will furnish the full range of maximum to minimum light intensity. This angular displacement is well within the capabilities of mirror type galvanometers conventionally used in geophysical recording.

It should be noted that although the preferred arrangement requires the use of cylindrical lens 21 to focus the light transmitted through the aperture into a line image, with light of sufficient intensity and with film of sufficient sensitivity the height of aperture 20 could be the same as the width of the image 22, thus eliminating the need for lens 21. In this event film 23 would be placed close to the barrier 19. As a practical matter, however, lens 21 will usually be necessary for best results.

Figure 2 diagrammatically illustrates an arrangement adapting the system of this invention to multiple channel recording. A plurality of galvanometers 18a to 18n are provided which may be arranged in an essentially straight line as in conventional seismograph recording. More conveniently, since the light sources presently to be referred to take up more lateral space than the width of the photographic film on which the record is made, the galvanometers are arranged on an arc of large radius as shown in Figure 2. The light source for each galvanometer comprises a small lamp 27 which conveniently is of the type provided with its own condensing lens 28. Such lamps are commercially available and are commonly known as "grain of wheat" lamps or surgical instrument lamps. Interposed between each of the lamps and its corresponding galvanometer is a sheet polarizer film 13 arranged in a plane normal to the path of travel of the light beam from the lamp to the galvanometer. Each beam of polarized light passes through a second polarizing film suspended on each of the galvanometers as in Figure 1 and the light that leaves the second film passes through an aperture 19 in the barrier 29 and thence through condensing lens 20 to the photographic medium on the drum 24. To prevent the light from each galvanometer from passing through an aperture other than its own aperture a plurality of channel shields 30 are provided. Thus a plurality of variable density traces representing the signals applied simultaneously to the various galvanometers can be recorded side by side on the photographic medium. To prevent scatter of the beams of light outside their appropriate channels it may be found desirable to utilize a converging lens 31 at the head of each of the channels.

It will be noted that the shield 14 and aperture 15 of Figure 1 are not used in the apparatus of Figure 2. Their use is not necessary if the conventional window 35 in the galvanometer housing is sufficiently small to serve the same purpose.

It is not intended that this invention be limited by the specific embodiments described, which have been presented by way of example only. The scope of the invention is defined in the following claims.

What is claimed is:

1. An optical system for making a photographic record of an electrical transient which comprises means furnishing a beam of polarized light, a moving coil galvanometer, a sheet polarizer rotatably supported by said galvanometer wherein the axis of polarization of said sheet polarizer is arranged at an angle of about 45° from the axis of rotation of said galvanometer and at an angle of about 90° from the direction of polarizaiton of said beam of polarized light, and with said sheet polarizer being further characterized in being supported in the at-rest position of said galvanometer at an angle of approximately 30° out of the plane normal to said polarized light beam, whereby rotation of said galvanometer in one direction will increase, and rotation in the opposite direction will decrease, the amount of light transmitted through said sheet polarizer, a light barrier placed in the path of light passing through said sheet polarizer, said barrier having an aperture of selected size and shape in said light path, and means for moving a photographic medium past the aperture beyond the light barrier at a predetermined speed.

2. System as defined by claim 1 including a cylindrical lens between the barrier and the recording medium and aligned with the aperture to condense the light passing through the aperture into a line image, said photographic medium being posiitoned in the plane of focus of said cylindrical lens.

References Cited in the file of this patent

UNITED STATES PATENTS

| 1,794,966 | Legg | May 3, 1931 |
| 2,123,743 | Pratt | July 12, 1938 |
| 2,267,356 | Ritzmann | Dec. 23, 1941 |
| 2,436,148 | Maurer | Feb. 17, 1948 |

FOREIGN PATENTS

| 482,331 | Great Britain | Mar. 28, 1938 |